Aug. 31, 1954  A. B. STERN  2,687,723
ELASTIC COMPRESSION BANDAGE
Filed Aug. 16, 1952
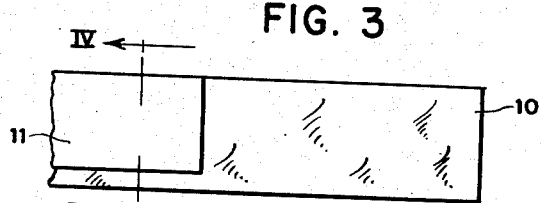
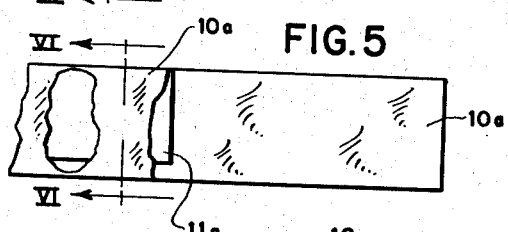
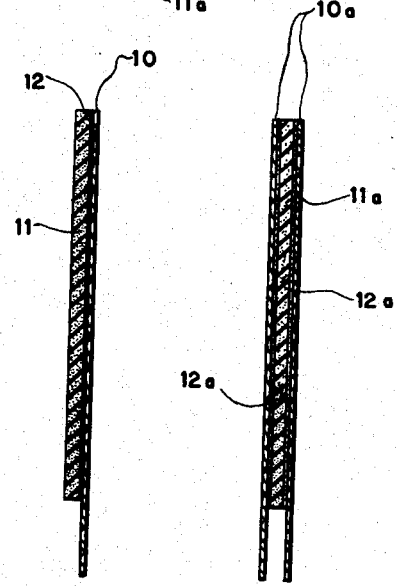
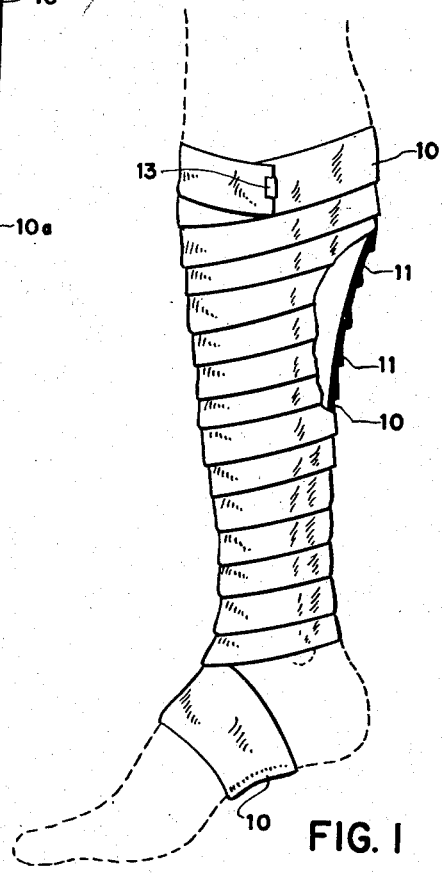
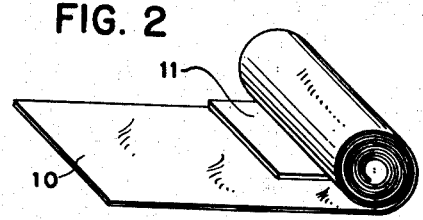
INVENTOR.
Arthur B. Stern
BY
ATTORNEY Patented Aug. 31, 1954

2,687,723

UNITED STATES PATENT OFFICE 2,687,723

ELASTIC COMPRESSION BANDAGE

Arthur B. Stern, Brooklyn, N. Y.

Application August 16, 1952, Serial No. 304,755

4 Claims. (Cl. 128—169)

The present invention relates to a special design and construction of bandage particularly adapted for the reduction of edema in a human limb such as that resulting from thrombophlebitis, varicose veins and lymphatic disease.

It has long been recognized that a serious problem exists in applying bandages to edematous areas of the body, such as the lower legs. It is highly undesirable to apply bandages over these edematous areas in such a manner that they are tight-fitting or impervious to air and a loose-fitting bandage is of no value. Known or conventional bandages do not provide what have been found to be the necessary qualities of compressibility and perviousness, and, so far as I am aware, there is no previously known bandage suited for use over edematous areas and, therefore, the present invention is concerned with the practical solution of this problem.

One of the objects of the present invention is, accordingly, to provide for the first time a bandage especially designed and adapted for bandaging edematous areas, such as human legs, and characterized by the requisite properties for this purpose.

Another object of the invention resides in the production of a bandage of elastic woven material which has linear or longitudinal but not transverse stretch and which is provided throughout the major proportion of its length along one side thereof with a relatively thin, soft, pliant and compressible layer or liner of foam or sponge rubber secured, preferably adhesively, to the bandage material, the said layer or liner being shorter and narrower than the elastic woven bandage material.

Other and further objects and advantages will be understood or appreciated by those skilled in this art or will be apparent or pointed out hereinafter.

In the accompanying drawing:

Fig. 1 illustrates the general manner of applying the new bandage to a lower leg having varicose veins or other edematous condition;

Fig. 2 is a perspective view of a bandage in accordance with the invention in its rolled-up condition when not in use with one end thereof partially unrolled to illustrate the general position of the foam or sponge rubber layer on the bandage material;

Fig. 3 is a fragmentary plan view of the new bandage showing the arrangement of bandage material and foam or sponge rubber layer;

Fig. 4 is a transverse sectional view on an enlarged scale taken along line IV—IV of Fig. 3;

Fig. 5 is a view similar to Fig. 3 of a modified form of the invention wherein an additional strip of bandage material is employed over the foam or sponge rubber layer and Fig. 6 is a transverse sectional view on an enlarged scale taken along line VI—VI of Fig. 5.

The present invention is based upon the concept of providing uniform compression of a limb by means of forces perpendicular to the skin to produce maximal clinical effectiveness in reducing edema of a limb. This is accomplished by the specially designed and constructed bandage constituting the invention and which consists of an elastic woven membrane of bandage material on one side of which is secured an inner elastic and compressible lining. The action of such a bandage is that when it is wound upon the edematous limb to be treated, the tangential and circumferential forces created by pulling or stretching of the bandage result automatically in the development of forces perpendicular to the skin. The inner lining permits the evaporation of moisture, such as perspiration, from the skin either by the porosity of the lining material itself or by providing a multiplicity of pore-like openings or perforations therein.

Referring now to Figs. 1-4, in particular, it will be observed that the new bandage consists essentially of two main parts, namely, the woven elastic bandage material 10 and the foam or sponge rubber layer or liner 11, hereinafter referred to in the claims as a layer of foam rubber. The woven elastic bandage material may be of any known or suitable type of so-called "roll bandage" which is thin and has considerable linear or longitudinal stretch but little or no transverse stretch. This bandage material is usually of a somewhat open mesh so that it is pervious to air. The foam or sponge rubber layer or liner 11, i. e., the layer of foam rubber, is relatively thin ($\frac{1}{16}''-\frac{1}{4}''$), soft, light-weight, pliant and compressible. A liner or layer of such rubber of either natural or synthetic origin is disposed longitudinally of the bandage material and extends along one side thereof throughout the major proportion of the length of the bandage material but terminates short of each end. The rubber layer is, moreover, narrower than the bandage material and lies along one longitudinal edge of the bandage material, as will be clearly apparent from the drawing, and this constitutes an important feature of the invention, as will be hereinafter explained.

The foam or sponge rubber layer is secured to the strip of bandage material, preferably by means of a rubber-base cement 12 which is applied to that side of the rubber layer which is to contact the bandage material, and then the two are pressed together until they are dry. By using rubber cement or a rubber-base or synthetic base cement, the entire composite bandage is still able to stretch linearly or longitudinally and, when released, will contract to its initial condition. The invention is, however, not limited to the use of these cements or to adhesive uniting of the components since other modes of securing the foam or sponge rubber layer to the bandage material may be employed, such as by spaced multiple longitudinal rows of stitching or crisscross rows of stitching. This form of the invention is, however, not as versatile as the adhesively united components because it does not afford such ready extension and contraction and, therefore, may be considered as an optional mode of securing the parts 10 and 11 together. The invention, moreover, comprises the conjoint use of an adhesive and stitching in a further modified form thereof. When adhesive, such as a rubber-base cement, is employed it has been found best to apply the same throughout the entire extent of one longitudinal surface of said rubber layer.

In the modified form of the invention shown in Figs. 5 and 6, I have provided a so-called "sandwich" type of bandage wherein the layer of foam or sponge rubber 11a is secured adhesively or by stitching, or both, between two strips 10a of the bandage material. In the illustrated example, the foam rubber layer is first adhesively secured by means of cement 12a to one strip of bandage material and then the cement 12a is applied to the other surface of the foam rubber layer and the second strip of bandage material applied thereover and the entire composite bandage subjected to pressure until the adhesive dries. Therefore, the modified bandage of Figs. 5 and 6 is the same as that of Figs. 1-4 except for the addition of the second strip of bandage material 10a and it has been found that this modification has advantage in those instances where it is not desired to have the foam or sponge rubber come into direct contact with the human skin.

In applying the bandage to a lower leg, as illustrated in Fig. 1, the bandage is applied in the normal manner of any conventional roll bandage over the instep and under the arch of the foot, and is then helically wound up the leg and the free end secured in place by a conventional clip, pin or the like 13. However, the bandage is so applied that that side of the composite bandage, the lower side in Fig. 3, which has a marginal space between the longitudinal edge of the foam or sponge rubber, is uppermost, so that this free, longitudinal area of bandage material provides good overlap and enables the succeeding convolutions of the helically-wound bandage to lie relatively close and flat upon one another so that the bandage actually occupies, in use, little more space than the ordinary conventional bandage material alone.

Therefore, the disposition of the foam or sponge rubber layer on the bandage material together with the ready yieldability and compressibility of the rubber layer itself makes it possible to accomplish the objects and advantages herein recited and to provide a very comfortable and effective bandage which does not involve the disadvantages or dangers of prior bandages when applied to edematous limbs. Such a bandage likewise is not characterized by being bulky and conspicuous and, therefore, can be readily worn under hosiery, if desired. The characteristic of compressibility and yieldability, together with the perviousness of the bandage to air and the capacity of the rubber to absorb moisture, does not cause the entrapment of air or perspiration between the skin and the bandage or cause the bandage to be hot and uncomfortable but primarily the bandage is effective in protecting and controlling varicose veins and other edematous conditions and in avoiding tightness and irritation. Consequently, there is no intereference with circulation and yet the bandage controls the varicose veins while yielding to and accommodating irregularities in such varicose veins and other edematous conditions.

The foregoing is presented as illustrative and not as limitative since within the scope of the appended claims other and further modifications may be made without departing from the invention. The new bandage may be of any desired or required width, usually from 2"-6". The bandage material is preferably 10' in length.

I claim:

1. An elastic compression bandage which comprises a strip of bandage material and a superimposed shorter and narrower layer of foam rubber secured thereon, said rubber layer being secured to the strip of bandage material along one longitudinal edge of such bandage material and spaced from the other.

2. A bandage which comprises a strip of elastic woven air-pervious bandage material and a shorter and narrower layer of foam rubber adhesively secured to one side of said strip of bandage material along one longitudinal edge of such bandage material and spaced from the other, said bandage material being characterized by the capacity to stretch longitudinally and said rubber layer being soft, pliant, yielding and readily compressible and adapted to stretch and contract in conformity with stretching and contracting movements of said strip of bandage material.

3. A bandage in accordance with claim 2 in which said strip of bandage material and said rubber layer are adhesively secured by means of a rubber-base cement throughout one longitudinal surface of said rubber layer.

4. A bandage in accordance with claim 2, in which an additional strip of bandage material is disposed on the other surface of said rubber layer and secured thereto to provide a bandage composed of a layer of compressible rubber between two strips of bandage material.

References Cited in the file of this patent

UNITED STATES PATENTS

| Number | Name | Date |
|---|---|---|
| 2,560,712 | Bell | July 17, 1951 |
| 2,579,545 | Cadous | Dec. 25, 1951 |
| 2,619,961 | Stewart | Dec. 2, 1952 |
| 2,646,797 | Scholl | July 28, 1953 |

FOREIGN PATENTS

| Number | Country | Date |
|---|---|---|
| 11,613 | Great Britain | of 1908 |